(12) United States Patent (10) Patent No.: US 12,559,322 B2
Catroneo, Jr. (45) Date of Patent: Feb. 24, 2026

(54) SYSTEM AND METHOD FOR LUBRICATING A CONVEYOR

(71) Applicant: Dubois Chemicals, Inc., Sharonville, OH (US)

(72) Inventor: Robert Steven Catroneo, Jr., Inglis, FL (US)

(73) Assignee: DuBois Chemicals, Inc., Sharonville, OH (US)

( * ) Notice: Subject to any disclaimer, the term of this patent is extended or adjusted under 35 U.S.C. 154(b) by 0 days.

(21) Appl. No.: 18/590,151

(22) Filed: Feb. 28, 2024

(65) Prior Publication Data

US 2024/0383697 A1 Nov. 21, 2024

Related U.S. Application Data

(60) Provisional application No. 63/502,716, filed on May 17, 2023.

(51) Int. Cl.
*B65G 45/02* (2006.01)
*F16N 7/28* (2006.01)
*F16N 25/00* (2006.01)

(52) U.S. Cl.
CPC .............. *B65G 45/02* (2013.01); *F16N 7/28* (2013.01); *F16N 25/00* (2013.01); *F16N 2210/24* (2013.01)

(58) Field of Classification Search
CPC . B65G 45/02; F16N 7/28; F16N 25/00; F16N 2210/24; F16N 9/00
USPC ........................................................ 184/15.1
See application file for complete search history.

(56) References Cited

U.S. PATENT DOCUMENTS

| | | | | |
|---|---|---|---|---|
| 4,262,776 | A | * | 4/1981 | Wilson .................... F16N 15/00 |
| | | | | 198/500 |
| 4,749,059 | A | * | 6/1988 | Jonnes ...................... F16N 7/12 |
| | | | | 118/DIG. 18 |
| 5,247,957 | A | * | 9/1993 | Weisse .................... F16N 27/00 |
| | | | | 137/89 |
| 5,360,084 | A | * | 11/1994 | Graf ......................... B61K 3/02 |
| | | | | 184/15.3 |
| 6,102,161 | A | * | 8/2000 | Gomez Diaz .......... B65G 45/02 |
| | | | | 184/15.3 |
| 6,302,263 | B1 | * | 10/2001 | Bennett .................. B65G 45/02 |
| | | | | 198/500 |

(Continued)

*Primary Examiner* — Anna M Momper
*Assistant Examiner* — Mark K Buse
(74) *Attorney, Agent, or Firm* — Dinsmore & Shohl LLP

(57) ABSTRACT

A conveyor lubricating system includes a lubricant feed line, a lubricant applicator including a lubricant flow regulator and a lubricant brush, and a cantilevered support arm including a first rigid member and a second rigid member connected together by a pivoting joint. The lubricant flow regulator is fluidly connected to the lubricant feed line and the lubricant brush is fluidly connected to the lubricant flow regulator. The lubricant brush includes bristles and a manifold to distribute the conveyor lubricant across a width of the lubricant brush. The first rigid member is secured to the lubricant applicator at an end opposite the pivoting joint and the second rigid member is secured to a stationary support such that the second rigid member is cantilevered over a conveyor and such that the lubricant brush contacts the conveyor. An associated method of applying conveyor lubricant to a conveyor is also provided.

19 Claims, 5 Drawing Sheets

(56) References Cited

U.S. PATENT DOCUMENTS

| | | | | |
|---|---|---|---|---|
| 6,575,291 | B2 * | 6/2003 | Bennett | B65G 45/22 |
| | | | | 198/500 |
| 10,343,849 | B2 * | 7/2019 | Turck | F16N 29/02 |
| 11,852,234 | B1 * | 12/2023 | Marrero | F16N 3/00 |
| 2007/0119686 | A1 * | 5/2007 | Divisi | G01N 19/02 |
| | | | | 198/502.1 |
| 2010/0300811 | A1 * | 12/2010 | Brink | B65G 45/02 |
| | | | | 184/15.1 |
| 2011/0022237 | A1 * | 1/2011 | Bennett | F16N 21/04 |
| | | | | 700/283 |
| 2016/0176648 | A1 * | 6/2016 | Van Den Berg | G01N 19/02 |
| | | | | 198/340 |
| 2018/0208405 | A1 * | 7/2018 | Turck | B65G 45/02 |
| 2020/0361715 | A1 * | 11/2020 | Meier | B25J 19/02 |

* cited by examiner

SYSTEM AND METHOD FOR LUBRICATING A CONVEYOR

CROSS REFERENCE TO RELATED APPLICATIONS

This application claims the benefit of U.S. Provisional Application Ser. No. 63/502,716, filed May 17, 2023.

TECHNICAL FIELD

The present disclosure is generally directed to conveyor lubricating systems and associated methods of applying conveyor lubricant to a conveyor.

BACKGROUND

In a variety of manufacturing processes, lubricant is applied on the surface of conveyors to allow shifting of items on the conveyor. For example, bottling lines which convey bottles to filling stations, capping stations, and packaging stations may have a lubricant applied to the surface of conveyors forming a part of the bottling line to allow for redirection and shifting of the bottles on the conveyor by reducing the frictional force between the conveyor and the bottles. Specifically, conveyors used in bottling lines typically include large areas of multiple parallel conveyors where bulk bottles may be deposited which are then corralled into one or more narrow conveyor runs providing a single file line of bottles. In order to prevent the bottles or other containers from tipping over as the bottles are shifted to align with the narrow conveyor runs, a lubricant is typically applied to the surface of each conveyor. The lubricant must be uniformly applied over the surface of the conveyors to achieve the desired friction between the bottles and the conveyors.

One way to achieve this uniform application of lubricant is to spray a diluted solution of the lubricant onto the conveyor. This provides even distribution of the lubricant but creates a large volume of waste lubricant. Excess lubricant simply drips off the conveyor where it must be collected and disposed of.

To avoid waste and reduce overall volume, dry or undiluted lubricant can be applied to the conveyor system. Less undiluted lubricant is applied than would be applied with a diluted lubricant. Therefore, less lubricant drips off the conveyor reducing the waste disposal problem. Because less lubricant is applied, it is difficult to achieve the uniform dispersion of the lubricant across the conveyor surface. A variety of applicators and application methods have been used to apply the uniform dispersion of the lubricant across the conveyor surface. However, variations in the surface of the conveyor may result in the applicator skipping along or failing to continuously contact the conveyor resulting in non-uniform application of the lubricant.

Accordingly, a conveyor lubricating system and method of method of applying conveyor lubricant to a conveyor where the applicator retains constant contact with the conveyor is desired.

SUMMARY

The conveyor lubricating system of the present disclosure leverages a cantilevered support arm to allow for adaptive motion of a lubricant applicator to retain the applicator in constant contact with the conveyor. More particularly, the cantilevered support arm includes a pivoting join such that one end may be affixed to a support structure while allowing another end to move to retain the applicator in contact with the conveyor and without the need for controlled repositioning of the applicator.

According to one embodiment, a conveyor lubricating system is provided. The conveyor lubricating system comprises a lubricant feed line; a lubricant applicator comprising a lubricant flow regulator and a lubricant brush; and a cantilevered support arm comprising a first rigid member and a second rigid member connected together by a pivoting joint. The lubricant flow regulator is fluidly connected to the lubricant feed line which is configured to provide a conveyor lubricant to the lubricant flow regulator. Further, the lubricant brush is fluidly connected to the lubricant flow regulator, the lubricant brush comprising bristles and a manifold to distribute the conveyor lubricant across a width of the lubricant brush. The flow regulator is configured to adjust a flow rate of the conveyor lubricant provided to the lubricant brush. The first rigid member is secured to the lubricant applicator at an end opposite the pivoting joint. The second rigid member is secured to a stationary support such that the second rigid member is cantilevered over a conveyor and the bristles of the lubricant brush contact the conveyor.

According to another embodiment, a method of applying conveyor lubricant to a conveyor is provided. The method comprises providing said conveyor lubricant to a conveyor lubricating system according to the various suspects of the present disclosure, allowing the conveyor lubricant to deposit onto a working surface of the conveyor as the conveyor moves; and spreading the conveyor lubricant with a lubricant brush to evenly spread the conveyor lubricant across the working surface of the conveyor, wherein the lubricant brush is maintained in contact with the working surface of the conveyor by rotating the first rigid member at the pivoting joint of the cantilevered support arm to allow movement of the lubricating brush in a synchronous manner to variations in the positioning of the working surface of the conveyor.

These and additional objects and advantages provided by the embodiments of the present invention will be more fully understood in view of the following detailed description.

BRIEF DESCRIPTION OF THE DRAWINGS

The following detailed description of specific embodiments of the present disclosure can be best understood when read in conjunction with the drawings enclosed herewith.

DETAILED DESCRIPTION

Embodiments of the present disclosure generally relate to a conveyor lubricating system and associated method of applying conveyor lubricant to a conveyor utilizing the same. Specifically, embodiments of the present disclosure provide a conveyor lubricating system for application of a lubricant to a plastic and/or stainless conveyor belt used for transporting food and beverage packages.

Figure 1:
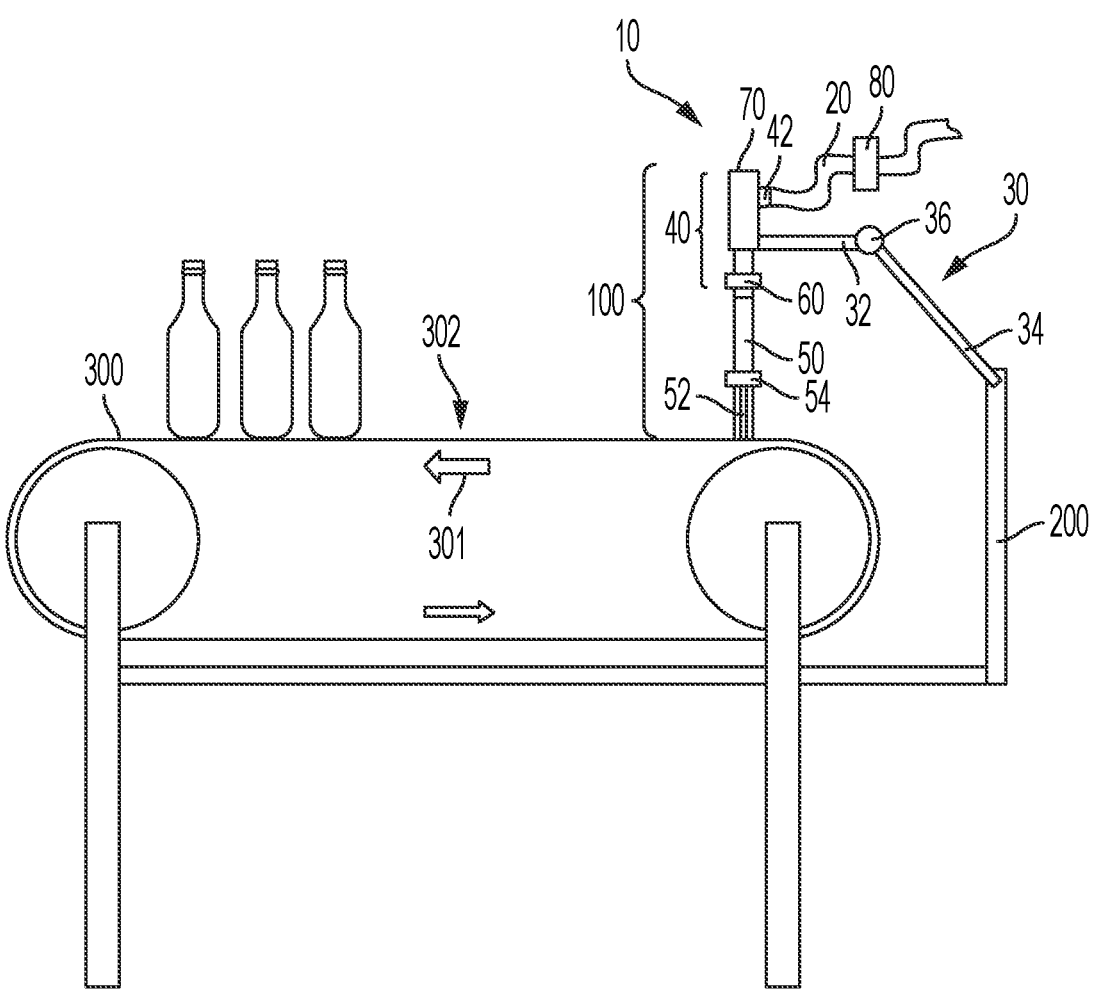
FIG. 1 is a schematic illustration of a conveyor including a conveyor lubricating system according to one or more embodiments of the present disclosure.
Figure 2:
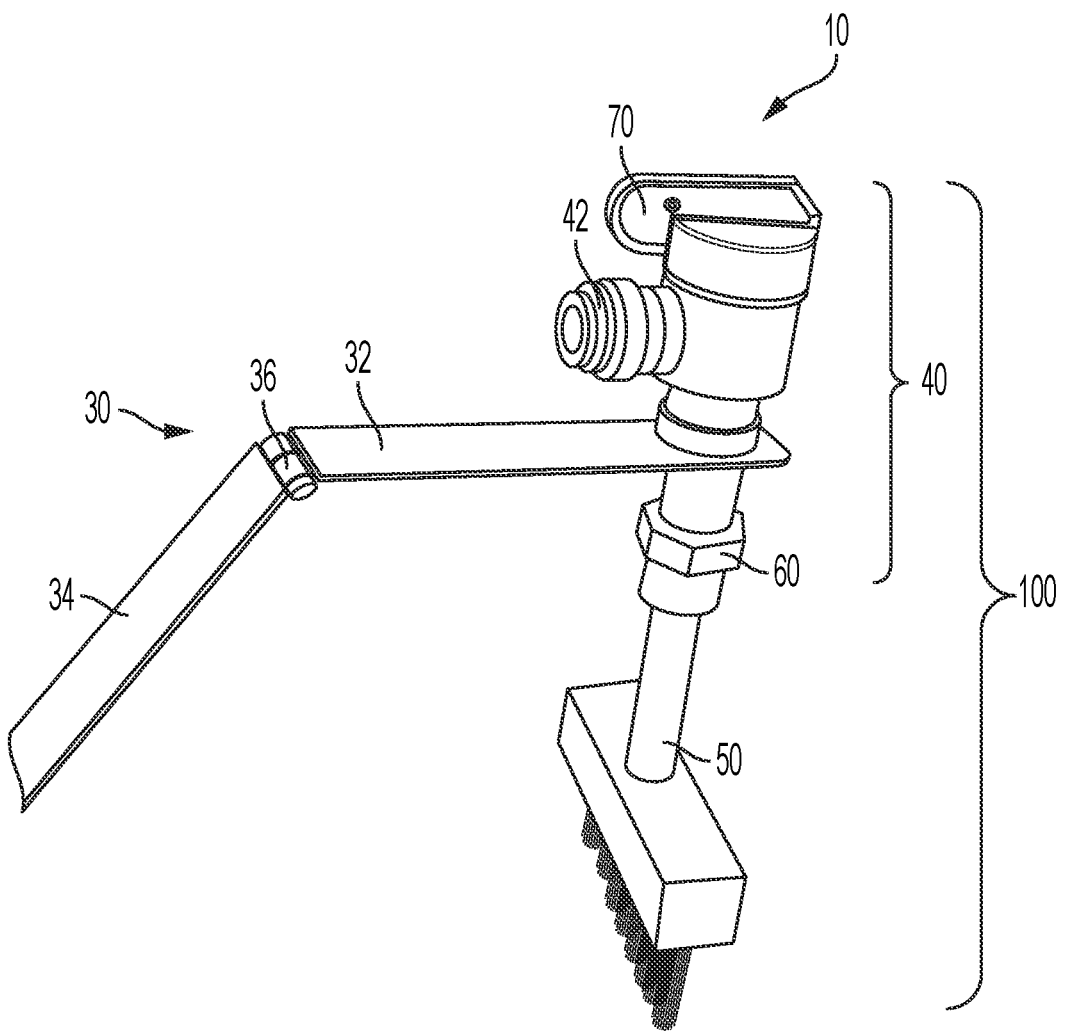
FIG. 2 is a schematic illustration of a conveyor lubricating system according to one or more embodiments of the present disclosure.
Figure 3:
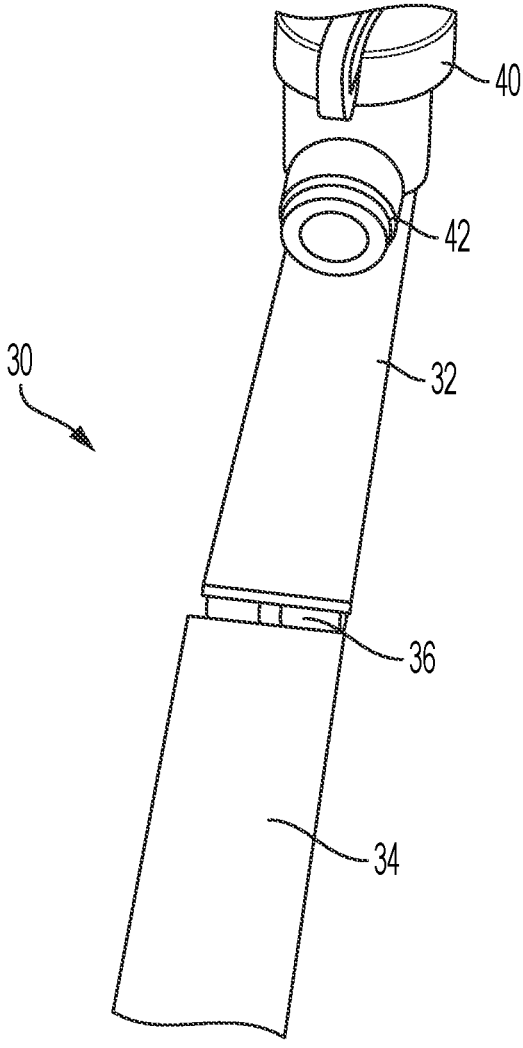
FIG. 3 is a schematic illustration of a cantilevered support arm provided as part of a conveyor lubricating system according to one or more embodiments of the present disclosure.

In accordance with embodiments of a conveyor lubricating system 10 and with reference to FIGS. 1-2, the system 10 comprises a lubricant feed line 20, a lubricant applicator 100, and a cantilevered support arm 30. The lubricant applicator comprises a lubricant flow regulator 40 and a lubricant brush 50. The lubricant flow regulator 40 is fluidly connected to the lubricant feed line 20 which is configured to provide a conveyor lubricant to the lubricant flow regulator 40. The lubricant brush 50 is fluidly connected to the lubricant flow regulator 40. Additionally, the flow regulator 40 is configured to adjust a flow rate of the conveyor lubricant provided to the lubricant brush 50. The lubricant brush 50 comprises bristles 52 and a manifold 54 to distribute the conveyor lubricant across a width (W$_B$) of the lubricant brush. The cantilevered support arm 30 comprises a first rigid member 32 and a second rigid member 34 connected together by a pivoting joint 36. The first rigid member 32 is secured to the lubricant applicator 100 at an end opposite the pivoting joint 36. The second rigid member 34 is secured to a stationary support 200 such that the second rigid member 34 is cantilevered over a conveyor 300 and the bristles 52 of the lubricant brush 50 contact the conveyor 300.

Having generally described embodiments of the conveyor lubricating system 10 in accordance with the present disclosure, further detail and additional embodiments will be provided.

Figure 5:
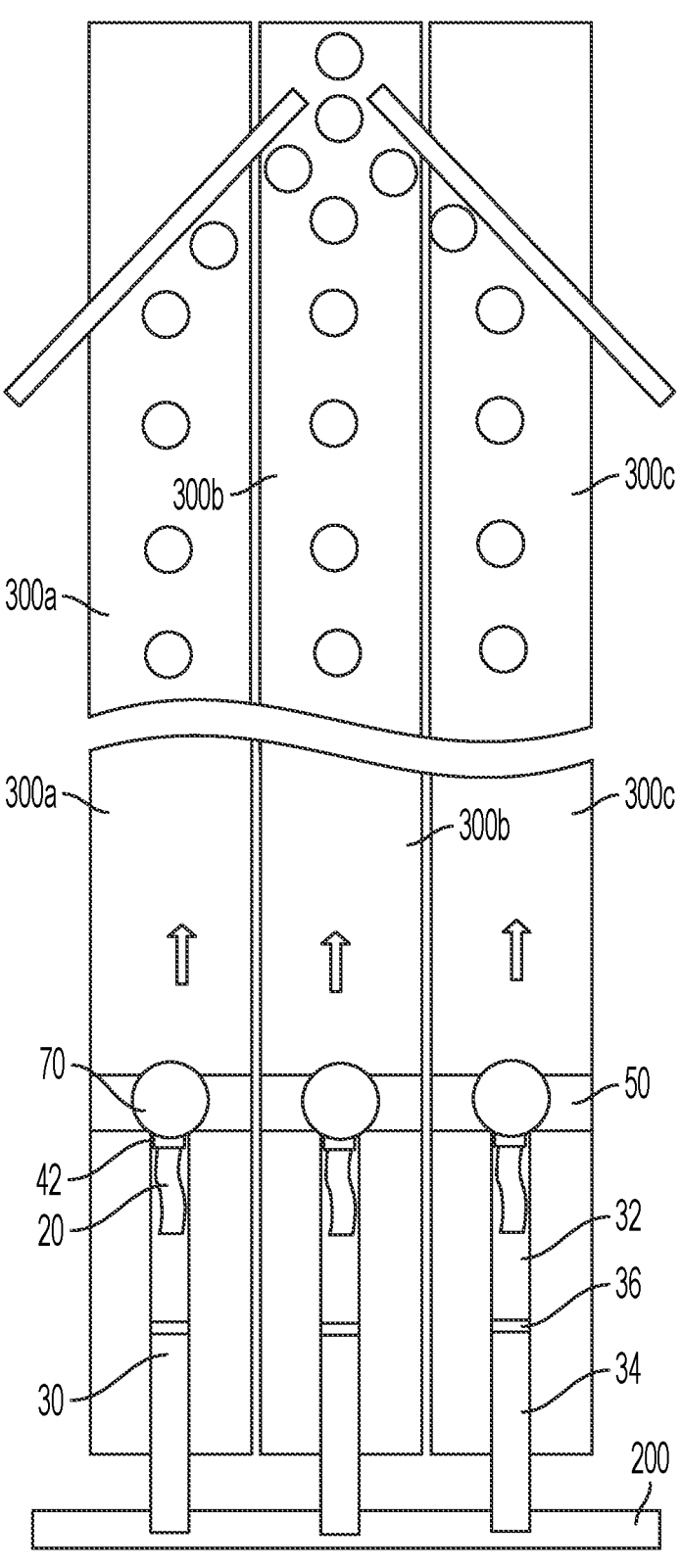
FIG. 5 is a schematic illustration of a bottling line integrating a conveyor lubricating system according to one or more embodiments of the present disclosure.

The conveyor lubricating system 10 includes a lubricant feed line 20. With reference to FIGS. 1 and 5, the lubricant feed line 20 provides a conveyor lubricant to the lubricant applicator 100 for deposition onto the conveyor 300. In various embodiments the lubricant feed line 20 may be formed from a rigid or flexible tubing. For example, in various embodiments, the lubricant feed line 20 may be formed from tubing comprising one or more of polyethylene, vinyl, PVC, polypropylene, and stainless steel.

The conveyor lubricant can be any lubricant suitable for use in conveyor lubrication. Typically, this will be what is referred to as a dry lubricant, one that is not diluted with water. These can include a wide variety of chemicals such as surfactants and fatty acids and the like. Selection of the appropriate conveyor lubricant is not considered a part of the present invention. However, for completeness, examples of suitable lubricants are provided. For example, the conveyor lubricant may be a silicon based lubricant comprising from 0.025 wt. % to 60 wt. % silicone, a polytetrafluoroethylene (PTFE) based lubricant comprising from 0.025 wt. % to 100 wt. % PTFE, or a fatty acid based lubricant comprising from 0.025 wt. % to 60 wt. % silicone, a polytetrafluoroethylene (PTFE) based lubricant comprising from 0.025 wt. % to 100 wt. % of a fatty acid.

The conveyor lubricating system 10 additionally includes a lubricant applicator 100 as illustrated in FIGS. 1 and 5. The lubricant applicator 100 directly applies the conveyor lubricant to the conveyor 300. The direct application of the conveyor lubricant to the conveyor 300 allows for the amount of conveyor lubricant applied to the conveyor 300 to be controlled. The lubricant applicator 100 includes a lubricant flow regulator 40 and a lubricant brush 50. The lubricant flow regulator 40 is fluidly connected to the lubricant feed line 20 and receives the conveyor lubricant from the lubricant feed line 20. Further, the lubricant brush 50 is fluidly connected to the lubricant flow regulator 40 and receives the conveyor lubricant for deposition onto the conveyor 300.

The lubricant flow regulator 40 is configured to adjust a flow rate of the conveyor lubricant provided to the lubricant brush 50. In one or more embodiments the lubricant flow regulator 40 includes a releasable connection 42 to the lubricant feed line 20. For example, the lubricant flow regulator 40 may include a male or female threaded connection sized to match a matching threaded connection at a terminal end of the lubricant feed line 20. Alternatively the lubricant flow regulator 40 may include a cam and groove type coupling in collaboration with a connector at a terminal end of the lubricant feed line 20 to form the releasable connection 42. In yet further embodiments, the lubricant flow regulator 40 may be fitted with a quick connect or quick release coupling for connection to a mating end of the lubricant feed line 20.

In one or more embodiments the lubricant flow regulator 40 comprises an orifice reduction plate 60 to reduce a pressure of the conveyor lubricant provided to the lubricant brush 50. Specifically, the orifice reduction plate 60 is provided in the flow path of the conveyor lubricant as it passes through the lubricant flow regulator 40. The orifice reduction plate 60, alternatively and commonly referenced as a restriction plate, is a relatively thin plate with a hole or orifice provided in the plate. The size of the orifice may be calibrated to provide a desired pressure drop or flow rate of the conveyor lubricant though the orifice reduction plate 60. Inclusion of the orifice reduction plate 60 may be desirable as the orifice reduction plate 60 does not require moving parts or frequent maintenance to regulate flow of the conveyor lubricant to the lubricant brush 50.

In various embodiments, the pressure in the lubricant feed line 20 may be from 10 pounds per square inch (psi) to 150 psi, 10 psi to 125 psi, 15 psi to 100 psi, 15 psi to 75 psi, 20 psi to 75 psi, or 20 psi to 50 psi.

In one or more embodiments the lubricant flow regulator 40 comprises a shut-off valve 70. The shut-off valve 70 allows for disconnection of the lubricant brush 50 from the lubricant feed line 20 to terminate flow of the conveyor lubricant. Termination of flow of the conveyor lubricant may be desirable during stoppage of the conveyor 300 such as during maintenance operations, between worker shifts, or when processing lines are idled. The shut-off valve 70 provides a closure mechanism to prevent leakage or flow of the conveyor lubricant into the lubricant brush 50 as the conveyor lubricant in the lubricant feed line 20 may be provided as a pressured flow.

With reference to FIGS. 1, 2, 4, and 5, the lubricant brush 50 comprises bristles 52 and a manifold 54 to distribute the conveyor lubricant across a width (W$_B$) of the lubricant brush 50. The manifold 54 is provided as a void in a brush block 58 and is in fluid connection with the lubricant flow regulator 40 and receives the conveyor lubricant. The manifold 54 distributes the conveyor lubricant across the width of the lubricant brush 50 such that the conveyor lubricant may be deposited across the conveyor 300.

In one or more embodiments, the manifold 54 is connected to a plurality of holes 56 to release the conveyor lubricant to the exterior of the lubricant brush 50. The holes 56 may be positioned on a surface of the lubricant brush 50 which faces the conveyor 300. The holes 56 allow for controlled and location specific release of the conveyor lubricant. The size, shape and location of the holes 56 may be determined by the desired rate and positioning of conveyor lubricant application as explained hereinafter.

Figure 4:
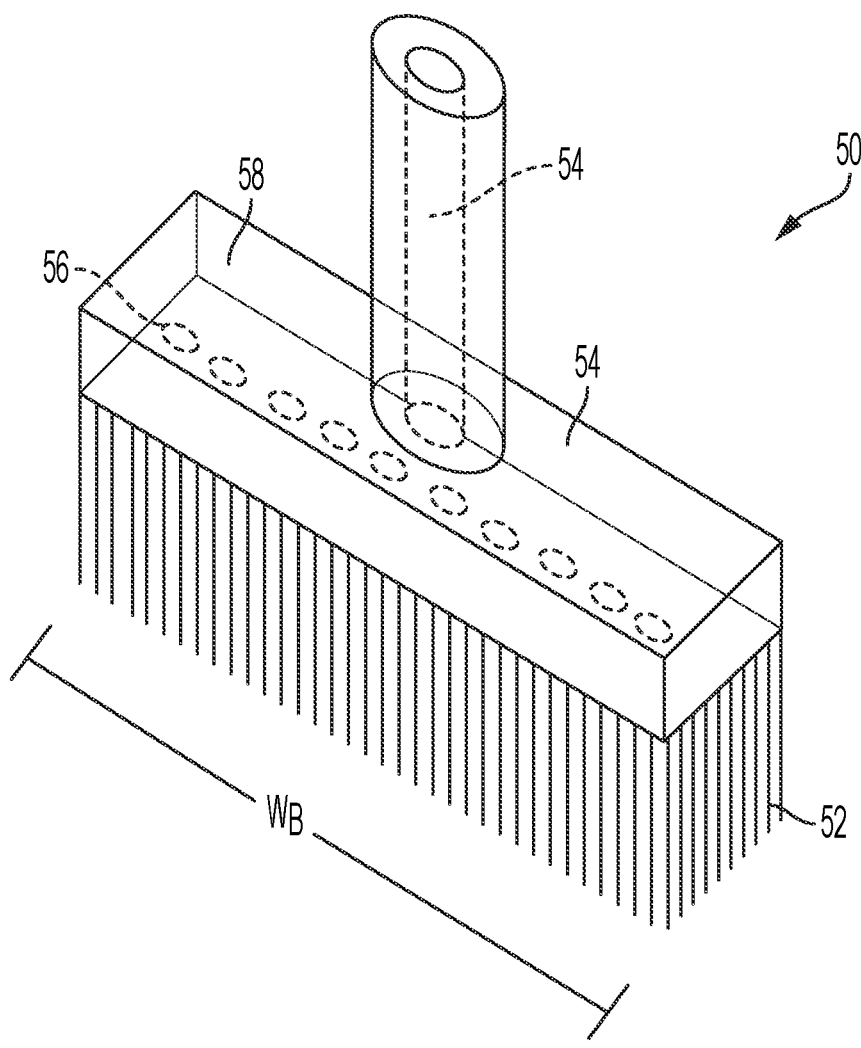
FIG. 4 is a schematic illustration of a lubricating brush provided as part of a conveyor lubricating system according to one or more embodiments of the present disclosure.

In one or more embodiments and with reference to FIG. 4, the plurality of holes 56 are positioned to deposit the conveyor lubricant directly onto the bristles 52 of the lubricant brush 50. Specifically, the holes 56 in the lubricant brush 50 connected to the manifold 54 may be positioned such that as conveyor lubricant is dripped or flowed from the holes 56 the conveyor lubricant contacts the bristles 52. As such, the conveyor lubricant may flow down the bristles 56 and be transferred to the conveyor 300. Specifically, the bristles 52 of the lubricant brush 50 are in contact with a working surface 302 of the conveyor 300 upon which the conveyor lubricant may be smeared or painted from the bristles 52.

In one or more embodiments, the plurality of holes 56 are positioned to directly deposit the conveyor lubricant onto the conveyor 300 at a position before a position where the bristles of the lubricant brush contact the conveyor based on a direction of travel of the conveyor 301. Specifically, the holes 56 may be positioned such that the conveyor lubricant drips or flows out of the holes 56 in the lubricant brush 50 and directly onto the working surface 302 of the conveyor 300. As the conveyor 300 is typically in motion, the newly deposited conveyor lubricant is transited past the conveyor brush 50 where the bristles 52 spread the newly deposited conveyor lubricant. Such technique is possible in accordance with the present disclosure as the arrangement of the conveyor lubricating system 10 including the cantilevered support arm 30 maintains the bristles 52 of the lubricating brush 50 in contact with the working surface 302 of the conveyor 300. In existing systems where the lubricating brush 50 may be susceptible to skipping or hopping of the lubricant brush 50 with undulations or surface imperfections on the working surface 302 of the conveyor 300 the deposited conveyor lubricant would not be distributed resulting in uneven lubrication of the conveyor 300.

The conveyor lubricating system 10 includes a cantilevered support arm 30 as illustrated in FIGS. 1, 2, 3, and 5. The cantilevered support arm 30 supports the lubricant applicator 100 over the conveyor 300 such that the conveyor lubricant may be deposited onto the working surface 302 of the conveyor 300. The cantilevered support arm 30 includes a first rigid member 32 and a second rigid member 34 which are connected together by a pivoting joint 36. The pivoting joint 36 allows for movement between the first rigid member 32 and the second rigid member 34 such that the lubricant applicator 100 remains in position and contacting the conveyor 300. Specifically, the first rigid member 32 is secured to the lubricant applicator 100 at an end opposite the pivoting joint 36, and the second rigid member 34 is secured to a stationary support 200 such that the second rigid member 34 is cantilevered over the conveyor 300 and the bristles 52 of the lubricant brush 50 contact the conveyor 300. However, as the bristles 52 of the lubricant brush 50 are subject to disruptions or undulations of the working surface 302 of the conveyor 300 the pivoting joint 36 allows the first rigid member 32 to rotate relative to the second rigid member 34 such that the lubricant brush 50 may maintain continuous contact with the conveyor 300. It is noted that the pivoting joint 56 allows the first rigid member 62 to move to retain the lubricant brush 50 in contact with the conveyor 300 without the need for controlled repositioning of the lubricant applicator 100. Specifically, the repositioning of the lubricant brush 50 to retain the bristles 52 in contact with the conveyor 300 is automatic and does not require a computer controller, motor, servo, or other component to operate.

The second rigid member 34 is secured to the stationary support 200 such that the second rigid member 34 is cantilevered over the conveyor 300 and the bristles 52 of the lubricant brush 50 contact the conveyor 300. In one or more embodiments the stationary support 200 is a frame member of the conveyor 300. It will be appreciated that affixing the second rigid member 34 to a frame member of the conveyor 300 allows for existing structures provided with the conveyor 300 to be leveraged to deploy the conveyor lubricating system 10. In one or more further embodiments the stationary support 200 may be a free standing support structure (not shown) provided proximal the conveyor 300.

It will be appreciated that in various embodiments, the lubricant brush 50 may be provided in a vertical orientation perpendicular to the conveyor 300 or in an orientation leaning into or away from the direction of travel of the conveyor 301 forming a non-perpendicular, orientation relative to the conveyor 300. For example the lubricant brush 50 may lean from −45 to +45 degrees, −30 to +30 degrees, −20 to +20 degrees, or −15 to +15 degrees relative to perpendicular to the conveyor 300.

The first rigid member 32 and the second rigid member 34 of the cantilevered support arm 30 are connected together by the pivoting joint 36. In one or more embodiments the pivoting joint 36 is a hinge. The hinge allows the first rigid member 32 and the second rigid member 34 to rotate at the pivoting joint 36 in a single axis maintaining the lubricant brush 50 aligned with the conveyor 300 but free to move vertically in relation to the conveyor 300 to maintain the bristles 52 in constant contact with the working surface of the conveyor 300. In one or more specific embodiments the pivoting joint 36 is a butt hinge.

In one or more embodiments the conveyor lubricating system 10 also includes an air pressure regulator 80. The air pressure regulator 80 may be configured to control a pressure of the conveyor lubricant in the lubricant feed line 20. As the flow rate of the conveyor lubricant into the lubricant brush 50 is at least partially dependent on the pressure of the conveyor lubricant provided to the lubricant applicator 100, adjusting the pressure of the conveyor lubricant in the lubricant feed line 20 may generate a concurrent adjustment to the feed rate of conveyor lubricant to the lubricating brush 50.

In one or more embodiments, the air pressure regulator 80 controls the air pressure provided to an air driven pump. In accordance with such embodiments, the pump speeds up or slows down depending on the air pressure. Specifically, a greater air pressure generates a stronger pump pressure and thus a greater flow rate of the conveyor lubricant is provided to the lubricant applicator 100. In one or more embodiments, the air pressure is 20 to 40 psi.

In one or more embodiments, a water driven metering pump may also be utilized. Specifically a metering pump may dilute a concentrate of the conveyor lubricant 10% to 1% with water. An example of such a metering pump is a dosatron D25 RE commercially available from Dosatron International (Clearwater, FL)

In one or more embodiments a plurality of lubricant brushes 50 are provided. Accordingly, the lubricant brushes 50 may be staggered across a width of the conveyor 300 to provide conveyor lubricant across the entire width of the conveyor 300. For example, the lubricant brush 50 may have a coverage area spanning a 3 inch width, but the conveyor 300 may have a total width of 9 inches necessitating three lubricant brushes 50 provided in parallel to apply the conveyor lubricant across the entire conveyor 300. It is noted that the conveyor 300 may also be formed from multiple conveyors 300*a*, 300*b*, 300*c* (three shown) provided in parallel. Further, in one or more embodiments, the plurality of lubricating brushes 50 may overlap to ensure coverage over the entire conveyor 300. FIG. 5 illustrates bottles progressing along a bottling line in three lanes which are reduced to a single lane.

In one or more embodiments with a plurality of lubricant brushes 50 and with reference to FIG. 5, each of the plurality of lubricant brushes 50 may be attached to separate lubricant flow regulators 40. Such arrangement allows for the application rate of conveyor lubricant from each of the lubricant brushes 50 to be individually controlled. Such arrangement also allows each of the plurality of lubricant brushes 50 to individually react to undulations on the conveyor 300 such that an undulation on the working surface 302 of the conveyor 300 in one area does not result in unintended lifting of the lubricant brush 50 in a separate region of the conveyor 300.

In one or more embodiments with a plurality of lubricant brushes 50, each of the plurality of lubricant brushes 50 may be attached to a single lubricant flow regulator 40 shared by the plurality of lubricant brushes 50. Such arrangement allows for a single lubricant feed line 20 to provide conveyor lubricant to all the lubricant brushes 50.

Having generally described the conveyor lubricating system 10, an associated method of applying conveyor lubricant to a conveyor is also provided. One or more embodiments of a method of applying conveyor lubricant to a conveyor comprises providing said conveyor lubricant to a conveyor lubricating system according to any of the various embodiments provided in the present disclosure. For example, the conveyor lubricating system may include a lubricant feed line 20, a lubricant applicator 100, and a cantilevered support arm 30. The lubricant applicator may comprise a lubricant flow regulator 40 and a lubricant brush 50. The lubricant flow regulator 40 may be fluidly connected to the lubricant feed line 20 which may be configured to provide a conveyor lubricant to the lubricant flow regulator 40. The lubricant brush 50 may be fluidly connected to the lubricant flow regulator 40. Additionally, the flow regulator 40 may be configured to adjust a flow rate of the conveyor lubricant provided to the lubricant brush 50. The lubricant brush 50 may comprise bristles 52 and a manifold 54 to distribute the conveyor lubricant across a width (W*B*) of the lubricant brush. The cantilevered support arm 30 may comprise a first rigid member 32 and a second rigid member 34 connected together by a pivoting joint 36. The first rigid member 32 may be secured to the lubricant applicator 100 at an end opposite the pivoting joint 36. The second rigid member 34 may be secured to a stationary support 200 such that the second rigid member 34 is cantilevered over a conveyor 300 and the bristles 52 of the lubricant brush 50 contact the conveyor 300. The method of applying conveyor lubricant to a conveyor may also include allowing the conveyor lubricant to deposit onto a working surface of the conveyor as the conveyor moves; and spreading the conveyor lubricant with the lubricant brush to evenly spread the conveyor lubricant across the working surface of the conveyor, wherein the lubricant brush is maintained in contact with the working surface of the conveyor by rotating the first rigid member at the pivoting joint of the cantilevered support arm to allow movement of the lubricating brush in a synchronous manner to variations in the positioning of the working surface of the conveyor.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

As used throughout, the singular forms "a," "an" and "the" include plural referents unless the context clearly dictates otherwise. Thus, for example, reference to "a" component includes aspects having two or more such components, unless the context clearly indicates otherwise.

Optional or optionally means that the subsequently described event or circumstances may or may not occur. The description includes instances where the event or circumstance occurs and instances where it does not occur.

It should be understood that any two quantitative values assigned to a property or measurement may constitute a range of that property or measurement, and all combinations of ranges formed from all stated quantitative values of a given property or measurement are contemplated in this disclosure.

As used here and in the appended claims, the words "comprise," "has," and "include" and all grammatical variations thereof are each intended to have an open, non-limiting meaning that does not exclude additional elements or steps.

Having described the subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A conveyor lubricating system comprising:

a lubricant feed line;

a lubricant applicator comprising a lubricant flow regulator and a lubricant brush, wherein:

the lubricant flow regulator is fluidly connected to the lubricant feed line which is configured to provide a conveyor lubricant to the lubricant flow regulator, the lubricant brush is fluidly connected to the lubricant flow regulator, the lubricant brush comprising bristles and a manifold to distribute the conveyor lubricant across a width of the lubricant brush wherein the manifold is an enclosed void in a brush block connected to a plurality of holes to release the conveyor lubricant to an exterior of the lubricant brush in a location specific manner, and the flow regulator is configured to adjust a flow rate of the conveyor lubricant provided to the enclosed void in the lubricant brush to control a rate of conveyor lubricant application through the plurality of holes to a conveyor; and a cantilevered support arm comprising a first rigid member and a second rigid member connected together by a pivoting joint, wherein:

the first rigid member is secured to the lubricant applicator at an end opposite the pivoting joint, and the second rigid member is secured to a stationary support such that the second rigid member is cantilevered over the conveyor and the bristles of the lubricant brush maintain contact with the conveyor without controlled repositioning of the lubricant applicator.

2. The conveyor lubricating system of claim 1 wherein the plurality of holes are positioned to deposit the conveyor lubricant directly onto the bristles of the lubricant brush.

3. The conveyor lubricating system of claim 1 wherein the plurality of holes are positioned to directly deposit the conveyor lubricant onto the conveyor at a position before a position where the bristles of the lubricant brush contact the conveyor based on a direction of travel of the conveyor.

4. The conveyor lubricating system of claim 1 wherein a plurality of lubricant brushes are provided, the lubricant brushes staggered across a width of the conveyor.

5. The conveyor lubricating system of claim 4 wherein each of the plurality of lubricant brushes are attached to separate lubricant flow regulators.

6. The conveyor lubricating system of claim 4 wherein each of the plurality of lubricant brushes are attached to a single lubricant flow regulator.

7. The conveyor lubricating system of claim 1 wherein the stationary support is a frame of the conveyor.

8. The conveyor lubricating system of claim 1 wherein the lubricant flow regulator comprises an orifice reduction plate to reduce a pressure of the conveyor lubricant provided to the lubricant brush.

9. The conveyor lubricating system of claim 1 wherein the flow regulator comprises a shut-off valve.

10. The conveyor lubricating system of claim 1 wherein the conveyor lubricating system further comprises an air pressure regulator configured to control a pressure of the conveyor lubricant in the lubricant feed line.

11. The conveyor lubricating system of claim 1 wherein the conveyor lubricant is a dry lubricant.

12. The conveyor lubricating system of claim 1 wherein the first rigid member and the second rigid member are connected together by a hinge.

13. The conveyor lubricating system of claim 12 wherein the hinge is a butt hinge.

14. A method of applying conveyor lubricant to a conveyor comprising:

providing said conveyor lubricant to a conveyor lubricating system comprising:
a lubricant feed line;
a lubricant applicator comprising a lubricant flow regulator and a lubricant brush,
wherein:
the lubricant flow regulator is fluidly connected to the lubricant feed line which is configured to provide the conveyor lubricant to the lubricant flow regulator,
the lubricant brush is fluidly connected to the lubricant flow regulator, the lubricant brush comprising bristles and a manifold to distribute the conveyor lubricant across a width of the lubricant brush wherein the manifold is an enclosed void in a brush block connected to a plurality of holes to release the conveyor lubricant to an exterior of the lubricant brush in a location specific manner, and
the flow regulator is configured to adjust a flow rate of the conveyor lubricant provided to the enclosed void in the lubricant brush to control a rate of conveyor lubricant application through the plurality of holes to a conveyor; and
a cantilevered support arm comprising a first rigid member and a second rigid member connected together by a pivoting joint, wherein:
the first rigid member is secured to the lubricant applicator at an end opposite the pivoting joint, and
the second rigid member is secured to a stationary support such that the second rigid member is cantilevered over the conveyor and the bristles of the lubricant brush maintain contact with the conveyor without controlled repositioning of the lubricant applicator;
allowing the conveyor lubricant to deposit onto a working surface of the conveyor as the conveyor moves; and
spreading the conveyor lubricant with the lubricant brush to evenly spread the conveyor lubricant across the working surface of the conveyor, wherein the lubricant brush is maintained in contact with the working surface of the conveyor by rotating the first rigid member at the pivoting joint of the cantilevered support arm to allow movement of the lubricating brush in a synchronous manner to variations in the positioning of the working surface of the conveyor.

15. The method of applying conveyor lubricant to a conveyor of claim 14 wherein a plurality of lubricant brushes are provided, the lubricant brushes staggered across a width of the conveyor.

16. The method of applying conveyor lubricant to a conveyor of claim 15 wherein each of the plurality of lubricant brushes are attached to separate lubricant flow regulators.

17. The method of applying conveyor lubricant to a conveyor of claim 15 each of the plurality of lubricant brushes are attached to a single lubricant flow regulator.

18. The method of applying conveyor lubricant to a conveyor of claim 14 wherein the manifold is connected to a plurality of holes positioned to deposit the conveyor lubricant directly onto the bristles of the lubricant brush.

19. The method of applying conveyor lubricant to a conveyor of claim 14 wherein the manifold is connected to a plurality of holes positioned to directly deposit the conveyor lubricant onto the working surface of the conveyor at a position before a position where the bristles of the lubricant brush contact the conveyor based on a direction of travel of the conveyor.

* * * * *